July 10, 1945.  D. ROSENHEIM  2,379,928
SPECTACLES
Filed Nov. 10, 1942
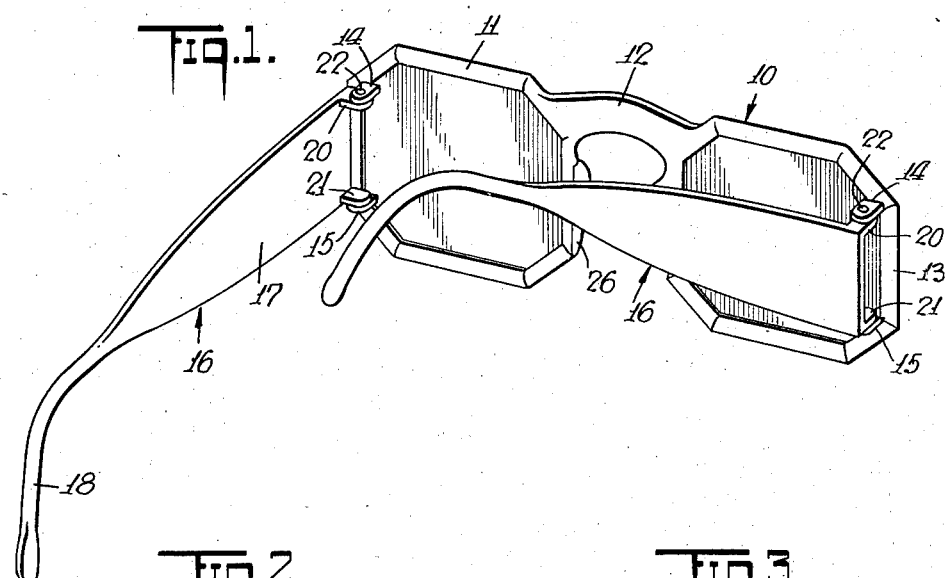
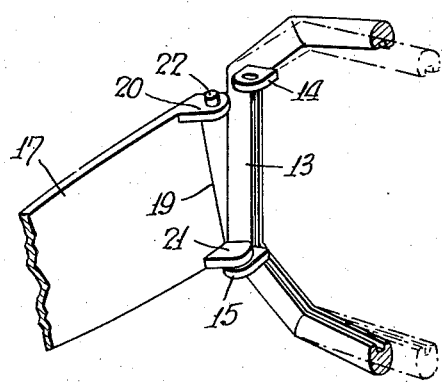
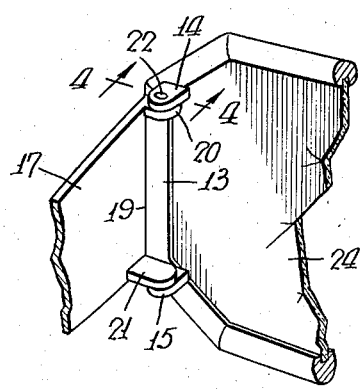
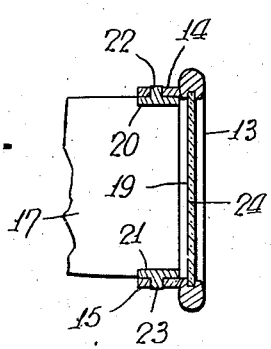
INVENTOR
David Rosenheim
BY
Dean Fairbank & Hirsch
ATTORNEYS Patented July 10, 1945

2,379,928

UNITED STATES PATENT OFFICE 2,379,928

SPECTACLES

David Rosenheim, New York, N. Y., assignor to Lapin Products, Inc., Newark, N. J., a corporation of New York Application November 10, 1942, Serial No. 465,121

3 Claims. (Cl. 88—41)

The present invention relates to spectacles, and while of more general application is of special utility for spectacles of the general type known as sunglasses, the frame and temples of which are essentially of thermoplastic resin.

An object of the invention is to provide spectacles, the entire glass or lens holding frame and temple structure of which is made up of only three pieces, the temples being directly hinged to the lens frame without resort to screws, rivets or other distinct hinging or fastening findings, all for ease and expedition of assembly, yet for complete security and durability without likelihood of strain, binding or rupture of the hinge mount.

In the accompanying drawing in which is shown one of various possible embodiments of the several features of the invention:

Fig. 1 is a perspective rear view of a pair of spectacles with one temple shown folded inward and the other in outermost position, Fig. 2 is a fragmentary perspective view on a larger scale showing the parts of the frame and temple in the process of assembly, Fig. 3 is a perspective view similar to Fig. 2 showing the hinge joint in the completely assembled device, and Fig. 4 is a view in transverse cross-section on line 4—4 of Fig. 3.

Referring now to the drawing the spectacles include a lens frame 10, generally of conventional construction including the lens or glass mounting bezels 11, connected by the intervening nose piece 12 unitary therewith, the inner beams of said bezels having nose pad projections 26.

The bezels have outer straight or rectilinear beams 13, the bezels being desirably of ornamental octagonal shape as shown.

Unitary with each end of the frame and extending at right angles to the lens are a pair of inturned parallel eyes 14 and 15 at opposite ends of the bezel beams 13.

The temples 16 preferably have widened and flattened shanks 17 which taper off to thicker bows 18 that hook over the ears of the wearer. The root end 19 of each temple is desirably straight and of a length equal to the corresponding beam 13 of the bezel to abut thereagainst and determine the outturned position of the temple as shown in Fig. 3.

The temples have inturned unitary lugs 20 and 21 between and engaging the eyes 14 and 15 respectively, the root end of the temple being thus straddled by said eyes. Rigid with the lugs 20 and 21 and preferably molded in a unit therewith are a pair of outstanding studs 22 and 23 respectively, which are axially aligned and which are encompassed or encircled by the respective eyes 14 and 15 for hinging accommodation therein.

The assembly of the parts is effected with facility. The sides of the open lens bezel 11 are stretched from the dash to the full line position position shown in Fig. 2, to displace the eyes 14 and 15 thereof slightly apart so that one stud 23 of the temple may be readily inserted in one eye 15 and the other stud 22 be brought into registry with the other eye 14, which snaps back to normal position as the distorting pressure upon the bezel is released.

The lens or glass pane 24 subsequently introduced into the bezel, maintains the frame rigid so that the eyes 14 and 15 of the bezels will be locked against displacement toward or away from each other or out of axial alignment. The hinging studs 22 and 23 on the temples are also maintained in fixed relative position, since the width of the intervening shank web 17 is stiff and precludes displacement of the studs toward each other. Since there is thus no relative displacement of the hinge eyes or of the hinge studs, the latter will move hingingly in the former, without the looseness or the strain or binding resulting where relative displacement or misalignment of the hinge parts is incurred.

While the invention lends itself to embodiment in various materials of which spectacles are commonly made, including various metals and plastics that are resiliently stretchable for the mode of assembly above set forth, it has particular utility in the low-priced articles, in which the frame as well as the temples are of molded thermoplastic resin such as cellulose acetate.

In the sunglass embodiment the temples are desirably of only slightly translucent material to prevent lateral glare. The term lens, as used in the claims, is intended to embrace the colored glass panes commonly used in sunglasses.

As many changes could be made in the above construction and many apparently widely different embodiments of this invention could be made without departing from the scope of the claims, it is intended that all matter contained in the above description or shown in the accompanying drawing shall be interpreted as illustrative and not in a limiting sense.

Having thus described by invention what I claim as new and desire to secure by Letters Patent is:

1. In spectacles of the type comprising a frame, with uninterrupted bezels, temples with wide shanks hinged to said frame and with straight base ends abutting against said frame in use; the combination in which the hinge mount comprises inturned lugs at the base ends of said temples, outwardly extending studs unitary with said lugs, and eyes unitary with the bezels, said studs bearing in said eyes said bezels being of material that is resiliently stretchable to permit spreading said eyes apart for insertion of said studs thereinto the lenses in said bezels serving to retain said eyes against relative displacement after assembly.

2. Spectacles comprising a lens frame and temples having a hinge mount thereon, said frame and temples being made entirely of molded thermoplastic resin, said lens frame having uninterrupted bezels with rectilinear parallel outer beams of substantially the same cross-section as the upper and lower parts of said bezels, said beams having unitary eyes at the ends thereof, extending at right angles to the lenses, said temples having widened shanks with inturned lugs between and engaging said eyes, outwardly extending, aligned studs unitary with said lugs and encompassed by and bearing in said eyes said bezels being of material that is resiliently stretchable to permit spreading said eyes apart for insertion of said studs thereinto, the lenses in said bezels serving to retain said eyes against relative displacement after assembly.

3. Spectacles comprising a lense frame and temples having a hinge mount thereon, said frame and temples being made entirely of molded thermoplastic resin, said lens frame having uninterrupted bezels with rectilinear parallel outer beams of substantially the same cross-section as the upper and lower parts of said bezels, said beams having unitary eyes at the ends thereof, extending at right angles to the lenses, said temples having widened shanks with inturned lugs between and engaging said eyes, outwardly extending, aligned studs unitary with said lugs, said shanks being continuous webs affording stiffness to prevent relative displacement of said studs, said studs being encompassed by and bearing in said eyes said bezels being of material that is resiliently stretchable to permit spreading said eyes apart for insertion of said studs thereinto, the lenses in said bezels serving to retain said eyes against relative displacement after assembly.

DAVID ROSENHEIM.